US007477279B2

(12) United States Patent
Ohnishi

(10) Patent No.: US 7,477,279 B2
(45) Date of Patent: Jan. 13, 2009

(54) IMAGE FORMING APPARATUS

(75) Inventor: Masato Ohnishi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 80 days.

(21) Appl. No.: 11/363,976

(22) Filed: Feb. 27, 2006

(65) Prior Publication Data

US 2006/0192836 A1 Aug. 31, 2006

(30) Foreign Application Priority Data

Feb. 28, 2005 (JP) ............................. 2005-053590

(51) Int. Cl.
*B41J 2/435* (2006.01)
*G02B 26/10* (2006.01)

(52) U.S. Cl. ........................ 347/263; 347/245; 347/138

(58) Field of Classification Search ................. 347/263, 347/245, 138
See application file for complete search history.

(56) References Cited

U.S. PATENT DOCUMENTS 5,956,072 A * 9/1999 Omura ....................... 347/263
6,137,614 A * 10/2000 Endoh ........................ 359/196

FOREIGN PATENT DOCUMENTS

JP 1994-123849 6/1994

* cited by examiner

*Primary Examiner*—Huan H Tran
(74) *Attorney, Agent, or Firm*—Jordan and Hamburg LLP

(57) ABSTRACT

In unit chassis 30 in which optical instruments are mounted, three of main fixing members 31, 32 and 33 formed in the reinforced reinforcing areas or in the contiguous areas thereof, as well as sunsidiary fixing member 34 connected to said main fixing members by flexible member 35, are provided, and unit chassis 30 is fixed by said fixing members in more than four places. The polygon mirror as a vibration source is mounted in the position 9x that are inside of a triangle PO formed by three of main fixing members 31, 32 and 33 or in the vicinity thereof. In this case, high-reinforcing area P2 reinforced more than any other area is formed between said position 9x and the position 8x of deflecting mirror for reflecting the scanned beam light. Main fixing members 31 and 32 among three of main fixing members are formed in two places having the high-reinforcing area between them.

23 Claims, 6 Drawing Sheets

IMAGE FORMING APPARATUS

BACKGROUND OF THE INVENTION

1. Field of the Invention

The present invention relates to an image forming apparatus comprising an optical unit that consists of optical instruments for image formation mounted in a solidly shaped chassis.

2. Description of the Related Art

The image forming apparatuses of electrophotographic system (such as copy machines, printers, and facsimiles) generally write an electrostatic latent image by scanning the beam light on the surface of the electrically-charged photoreceptor, or by exposing the surface of the photoreceptor by means of LED array light source that is arranged in the direction of the rotational axis of the drum-shaped photoreceptor. The beam light is emitted from the light source, such as a laser diode, then scanned in the prescribed main scanning direction by a light scanning apparatus that comprises optical instruments, such as one or a plurality of reflecting mirrors (deflecting mirror), lenses (such as f θ lenses), polygon mirrors (rotational polygon mirrors), thereby being led to the photoreceptor drum.

Here, the deterioration of image quality, such as unevenness or warps of the image, might occur when the accuracy of irradiation position of the beam light onto the photoreceptor drum is low.

Particularly, in regard to the image forming apparatus of the tandem system (that is to say, color image forming apparatus), which forms respective toner images of a plurality of colors (for example, the four colors including Black, Magenta, Yellow, and Cyan) onto a plurality of photoreceptor drums independently then superimposes and transfers these images, when the accuracy of relative irradiation positions between each of beam lights corresponding to each color (especially, the accuracy of skew) is low, there might occur relative misalignment in transferring positions of toner images of each color in addition to the unevenness and warps of images, thereby distinctly deteriorating image quality.

Considering the above, by unitizing the optical instruments for image formation by means of mounting them in a solidly shaped chassis, improvement of the positioning accuracy between each of the optical instruments is achieved, and therefore, the structure in which such unit is mounted in the main body of the image forming apparatus is frequently applied. Hereinafter, the chassis constituting such unit is referred to as "unit chassis". Here, above solid shape includes many shaping process such as solid forming, solid casting, solid molding, and solid pressing.

Generally, the unit chassis is fixedly supported at four places with respect to the supporting member in the side of the main body of the image forming apparatus. In this case, the gap between the supporting member and the unit chassis at the supporting member in one place may occur caused by, such as unevenness of the heights of supporting members in the side of the main body in four places and fluctuation in the shape of the unit chassis. This causes the warps of the unit chassis, thereby deteriorating the positioning accuracy of the optical instruments mounted therein.

In order to overcome the above, when the unit chassis is fixedly supported in three places against the supporting members in the side of the main body, the occurrence of such warps can be prevented, and the deterioration of the positioning accuracy of the optical instruments caused by the warp occurred by fixing the unit chassis can therefore be prevented.

Additionally, disclosed in Japanese Unexamined Patent Publication No. 1994-123849 is the structure, wherein warps of a base of the scanning optical apparatus is prevented by contacting a ball with the base of the scanning optical apparatus, then pressing the ball with a spring.

However, the unit chassis is nearly a cuboid in general. Therefore, when fixedly supported in three places, there may occur a part with weak restrained condition of displacement (hereinafter referred to as "free part") outside of a triangle formed by fixedly supporting members in the three places. When the percentage of this free part becomes large, it easily resonates with vibration of the driving members of, such as polygon mirrors and peripheral devices mounted in the unit chassis, and therefore, with such resonance, deterioration of the positioning accuracy of the optical instruments has been occurred.

In addition, with fixedly supporting the unit chassis in mainly three places, it may further be fixedly and subsidiarily supported to the extent that the unit chassis may not be warped by means of such as the spring mounted in a holder as disclosed in Japanese Unexamined Patent Publication No. 1994-123849. However, this structure required additional subsidiary parts such as a spring that forms the fixedly supporting mechanism, as well as additional mounting processes thereof.

Consequently, this invention has been invented considering the foregoing conditions, and the purpose of this invention is to provide the image forming apparatus having the structure that is able to combine the preventions of warps and resonance of the unit chassis in which the optical instruments for image formation are mounted, neither with additional parts nor additional mounting processes thereof.

SUMMARY OF THE INVENTION

In order to achieve the foregoing purpose, this invention is applied to the image forming apparatuses comprising a solidly shaped chassis (hereinafter referred to as "unit chassis"), in which optical instruments for image formation, such as a device for scanning a beam light exposing a photoreceptor and a light source for outputting such beam light are mounted, and is fixedly supported at a supporting member in the side of the main body. The unit chassis is supported by three of fixing members (hereinafter referred to as "main fixing member"), which are formed in reinforcing areas or in the contiguous areas thereof that are reinforced by a prescribed reinforcing structure such as rib structure and thick structure and fixedly supported by supporting members in the side of the main body, and at the same time, the unit chassis is also supported by one or more of the fixing member (hereinafter referred to as "subsidiary fixing member") which is connected to the above-mentioned main supporting members by the flexible member having flexibility in the unit chassis, and fixedly supported by the supporting member in the side of the main body. These three of the main fixing members and one or more of the subsidiary fixing member are respectively formed in a plurality of places that configures a polygon having four or more angles in the edges or in vicinity thereof of the unit chassis. Further, the optical instruments are mounted in the above-mentioned reinforcing area. Here, the unit chassis is consisted of such as plastic molding member (plastic molding part) made from a solid molding.

With the above structure, the reinforcing area hardly warps even when completely fixed by three of the main fixing members, and the optical instruments mounted therein can therefore be positioned with high accuracy.

On the other hand, the above-noted flexible member having flexibility is also properly supported by being fixed by the subsidiary fixing member in the remaining one place, and therefore, when warps are occurred in the unit chassis, merely the flexible member warps, and the positioning accuracy of the optical instruments mounted in the reinforcing area may not be influenced.

As described in the above, in the unit chassis forming nearly a cube in general, the percentage of the free part with weak restrained condition of displacement can be lowered by fixedly supporting in four or more places, and therefore, the resonance with the driving members of the polygon mirrors or peripheral devices mounted in the unit chassis can be prevented.

Moreover, this means that the solidly shaped unit chassis merely constitutes a particular structure, thereby neither involving additional mounting process nor additional parts.

Here, as a concrete structure of the flexible member, for example, a wall forming a part of the outer edge of the unit chassis can be applied, and such portion (wall) can be formed in the prescribed range across a buffering area not provided with the reinforcing structure (such as ribs) from the reinforcing area.

In addition, when the light scanning means, such as a polygon mirror for scanning light beam and a reciprocating resonant scanner that can be the vibration source, are included as a structural element of the optical instruments, it is preferred to have the structure in which such light scanning means are mounted inside of a triangle formed by three of the main fixing members or in vicinity thereof in the unit chassis.

The reason is that the inside of the triangle formed by three of the main fixing members or in vicinity thereof in the unit chassis is the particular position hardly resonates, compared with other areas, and therefore, the unit chassis in its entirety may not easily resonate.

Further in this case, in the area near the mounting position of the light scanning means outside of the triangle in the reinforcing area, the unit chassis can be consisted of ribs extendedly formed along the emitting direction from the light scanning means, in other words, along the direction of vibration propagation or the close direction thereof (direction intersecting at a sharp angle).

With the above structure, the vibration propagation from the vibration source (light scanning means) can be effectively deadened.

Additionally, when the light scanning means and the reflecting mirror that reflects the beam light scanned by the light scanning means across its scanning range are provided as the structural element of the optical instruments, the reflecting mirror is easily influenced particularly from the vibration propagated from the light scanning means among the optical instruments, since having a long and thin figure.

In such case, it is preferred to have a structure, in which the light scanning means as well as the reflecting mirror are mounted in the respective positions in both sides facing each other in the reinforcing areas of the unit chassis, and an area reinforced more than any other areas (hereinafter referred to as "high-reinforcing area") is formed in the area between the light scanning means and the reflecting mirror, and further, two among the three of the main fixing members are formed in two places having said high-reinforcing area between them.

With the structure noted above, the high-reinforcing area between two of the main fixing members hardly vibrates, and moreover, the propagation of the vibration from the light scanning means can be intercepted by the high-reinforcing area, thereby preventing the vibration propagated to the vibration-sensitive reflecting mirror.

In accordance with this invention, in the unit chassis in which the optical instruments for image formation are mounted, by providing more than four of the fixing members: three of the main fixing members formed in the reinforced reinforcing areas or in the contiguous areas thereof, and the subsidiary fixing member connected to the main members by the flexible member, and further, by fixing the unit chassis by these more than four of the fixing members, it is able to combine the preventions of warps and resonance of the unit chassis in which the optical instruments for image formation are mounted, neither with additional parts nor additional mounting processes thereof.

Moreover, it is particularly effective for resonance prevention when the light scanning means as the vibration source is mounted in the position or in vicinity thereof inside of a triangle formed by three of said main fixing members, and alternatively, when ribs are extendedly formed along the emitting direction from the light scanning means (vibration source), in other words, along the direction of vibration propagation or the close direction thereof (direction intersecting at a sharp angle) in the area close to the mounting position of the light scanning means (vibration source) outside of the triangle in the reinforcing areas.

In addition, when the light scanning means, as well as reflecting mirror for reflecting the beam light scanned by said light scanning means are provided, it is preferred for preventing the vibration to be propagated to said vibration-sensitive reflecting mirror to constitute the structure in which the light scanning means and the reflecting mirror are mounted in the respective positions in both sides facing each other in the reinforcing areas in the unit chassis, and the high-reinforcing area reinforced more than any other area is formed in the area between the light scanning means and the reflecting mirror, and furthermore, two among the three of the main fixing members are formed in two places having said high-reinforcing area between them.

BRIEF DESCRIPTION OF TEE DRAWINGS

Figure 6:
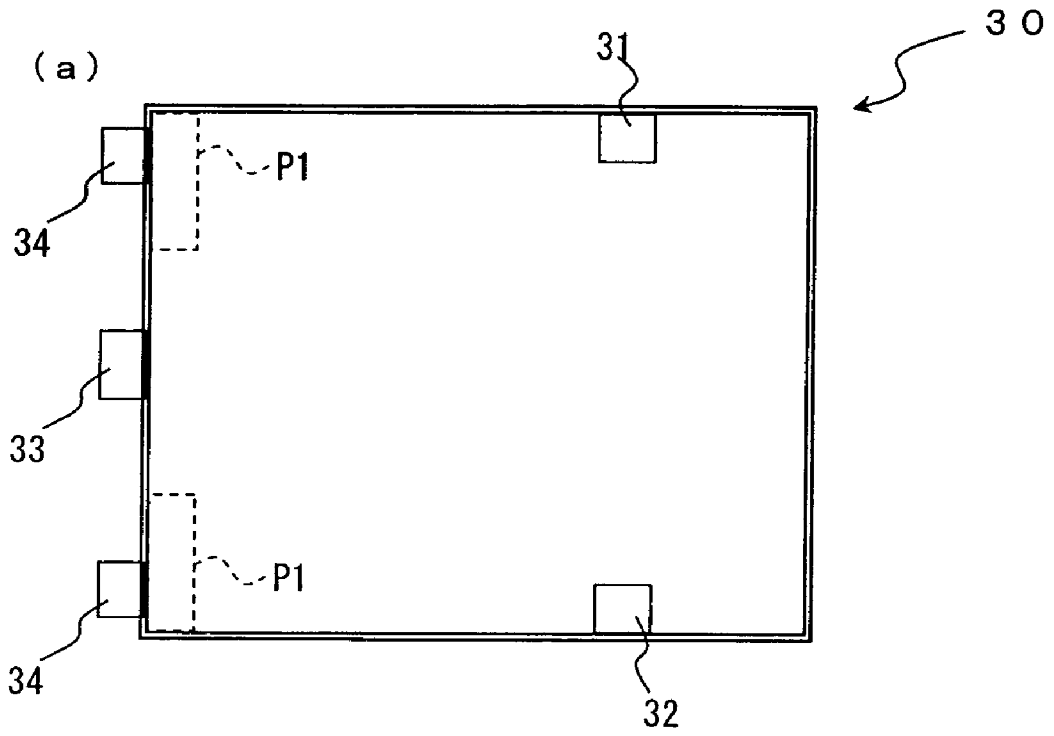
Figure 6:
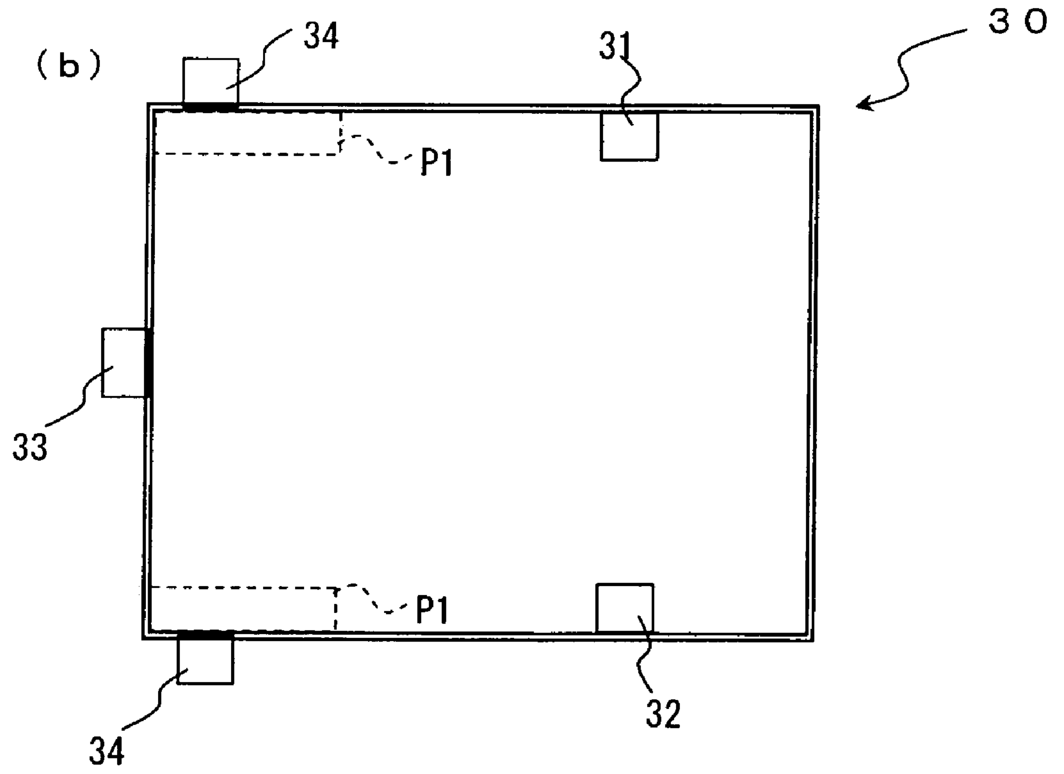

FIGS. 6 (*a*) and (*b*) are views indicating arrangement examples of fixing members in Unit chassis 30.

DETAILED DESCRIPTION OF THE PREFERRED EMBODIMENTS

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Image forming apparatus A according to an embodiment of the present invention is comprised of a unit chassis as a solidly shaped member in which the optical instruments for image formation are mounted. The unit chassis are provided with three of main fixing members formed in reinforced reinforcing areas or in the contiguous areas thereof, as well as one or more of subsidiary fixing member connected to the main fixing members by a flexible member. These fixing members and the subsidiary member are provided in the positions forming a polygon. This arrangement is one of the characteristics of Image forming apparatus A.

Figure 1:
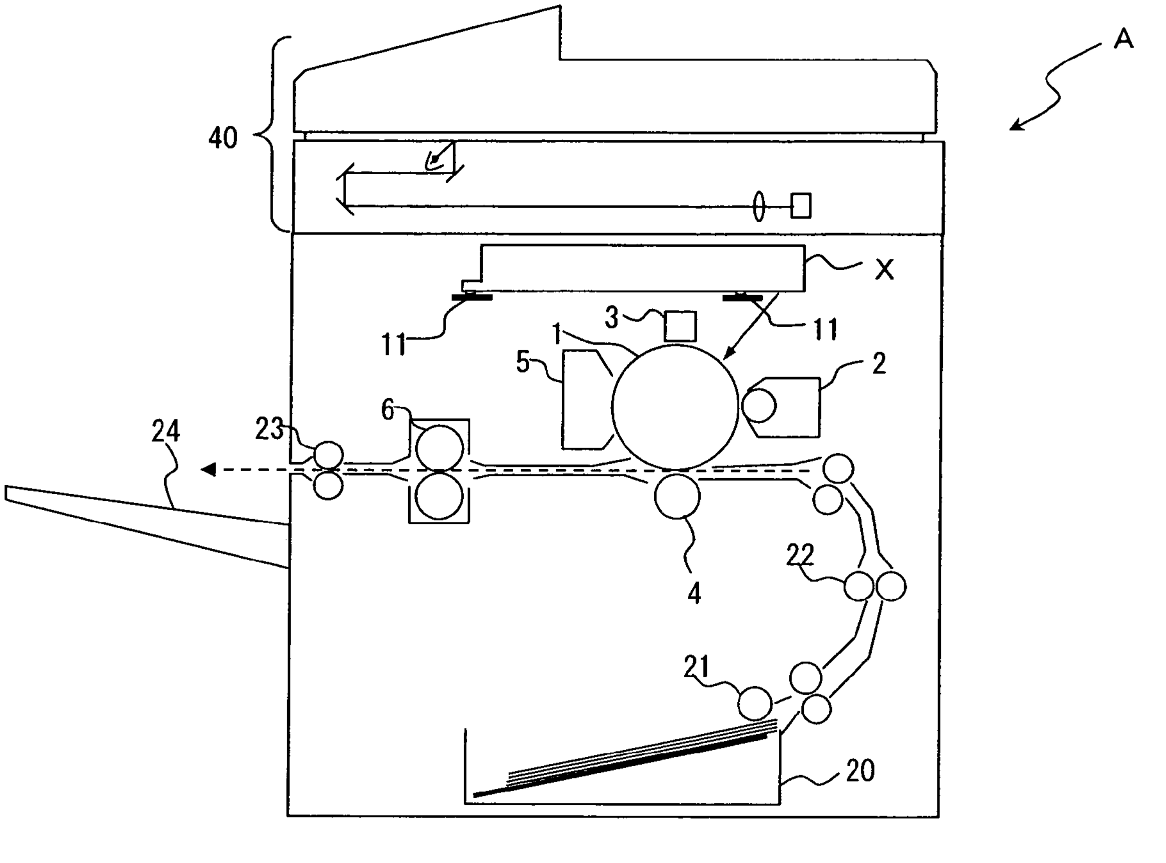
FIG. 1 is a schematic cross-sectional view showing an image forming apparatus A according to an embodiment of the present invention.

Firstly, as referring now to the schematic cross-sectional view illustrated in FIG. 1, Image forming apparatus A according to an embodiment of this invention is described.

Image forming apparatus A is an image forming apparatus of electrophotographic system, such as copy machines, printers, and facsimiles, which perform image formation as using toners, and FIG. 1 identifies a copy machine as an example.

As shown in FIG. 1, Image forming apparatus A is provided with: an image reader 40 for reading images from a manuscript, a paper feeding cassette 20 into which recording paper is loaded, a paper feeding roller 21 for extracting recording paper one by one from Paper feeding cassette 20, and a delivery roller 22 for delivering the extracted recording paper, and conducts image formation by transferring the toner image, which is based on the read image from the manuscript, onto a recording paper.

Furthermore, as a main member for conducting image formation, Image forming apparatus A is provided with: a photoreceptor drum 1 for supporting a toner image; a charging apparatus 3 for uniformly charging the surface of said photoreceptor drum 1; an optical unit X for writing an electrostatic latent image by exposure by scanning beam light onto the photoreceptor drum 1; a developing apparatus 2 for developing a toner image by supplying toner onto the electrostatic latent image; a transfer roller 4 for transferring the toner image onto a recording paper, neutralization apparatus 5 for removing electricity from the surface of Photoreceptor drum 1 that of after the transfer of the toner image onto a recording paper; and a fixing apparatus 6 for heat-fixing the toner image onto a recording paper, and the recording paper fixed with the toner image is discharged by a discharging roller 23 into a receiving trey 24.

Optical unit X is fixedly supported by fixing members in four places (later described) which are formed in its chassis (optical chassis) and fastened with screws to a supporting members 11 in the side of the main body of Image forming apparatus A.

Figure 2:
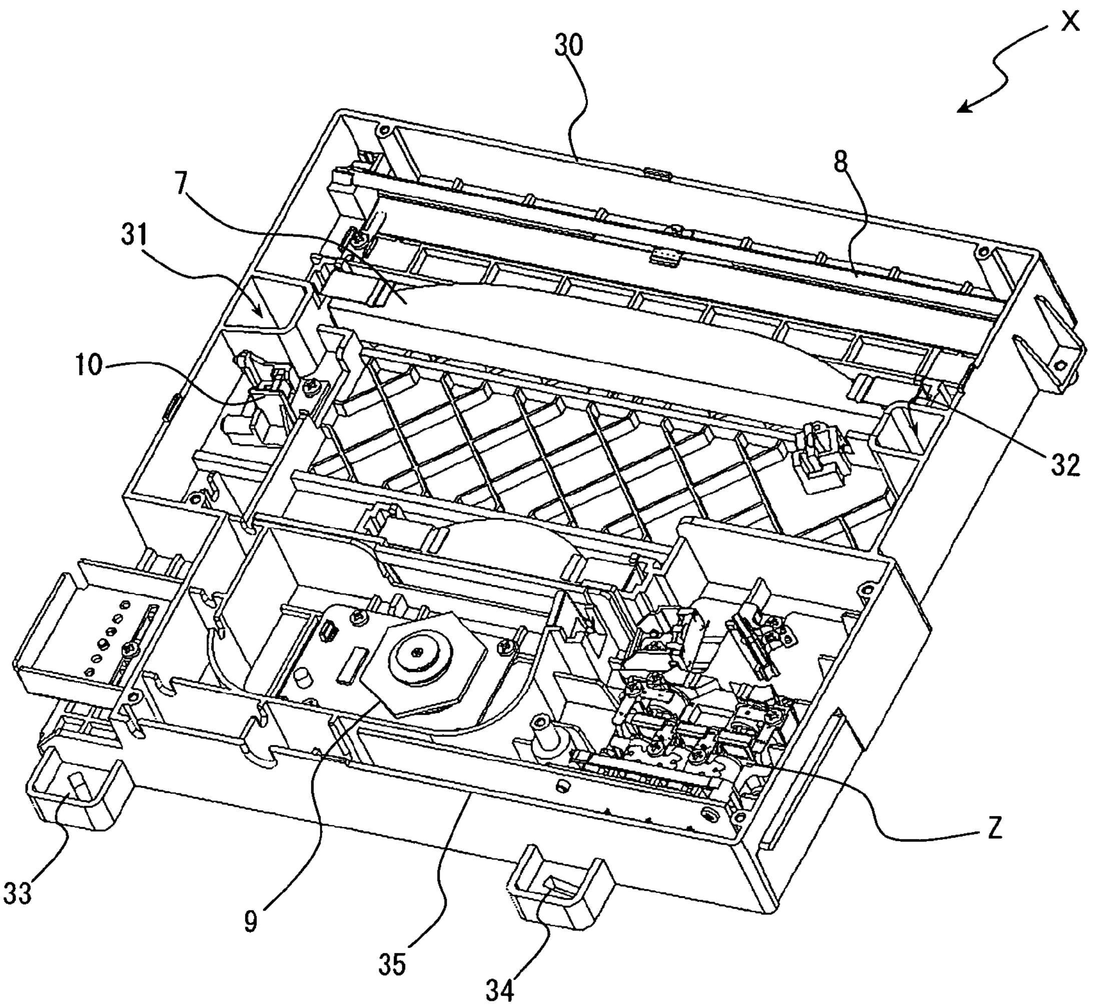
FIG. 2 is a schematic perspective view showing an optical unit X in Image forming apparatus A.

Next, Optical unit X is described as referring to the perspective view in FIG. 2.

Optical unit X is an optical instrument, which conducts output and scanning of beam light (laser light) with respect to Photoreceptor drum 1. Optical unit X is unitized by a chassis 30 (one example of plastic molding members) solidly shaped by such as plastic molding, in which optical instruments for image formation such as a light source Z, a deflecting mirror 8, a polygon mirror 9, a f θ lens 7, and a BD sensor 10 are mounted.

Light source Z is such as a laser diode embedded board that outputs beam light exposing Photoreceptor drum 1.

Also, Polygon mirror 9 is for scanning the beam light (light scanning means), which is output from Light source Z, in the prescribed main scanning direction.

F θ lens 7 is for adjusting the light path of the beam light so that the scanning speed of the beam light on the surface of Photoreceptor drum 1 has a constant speed.

Deflecting mirror 8 is a reflecting mirror for reflecting the beam light scanned by Polygon mirror 9 across its scanning range.

BD sensor 10 is a light sensor for detecting if the beam light reaches to the prescribed reference position, and based on its result, the scanning position of the beam light can be determined.

In Unit chassis 30, four of fixing members 31, 32, 33 and 34 fixedly supported by Supporting members 11 in the side of the main body are formed in the prescribed four places which form a square (one example of polygons), being as a vicinity of the wall (one example of the edge or the vicinity thereof) forming the outer edge of Unit chassis 30. These Fixing members 31, 32, 33 and 34 are also solidly shaped as a part of Unit chassis 30.

Hereinafter, the structure of Unit chassis 30 is described as referring to the plan view, bottom plan view, and the cross-sectional view (the cross-section surface of B-B position in FIG. 1) respectively in FIGS. 3, 4 and 5.

Figure 3:
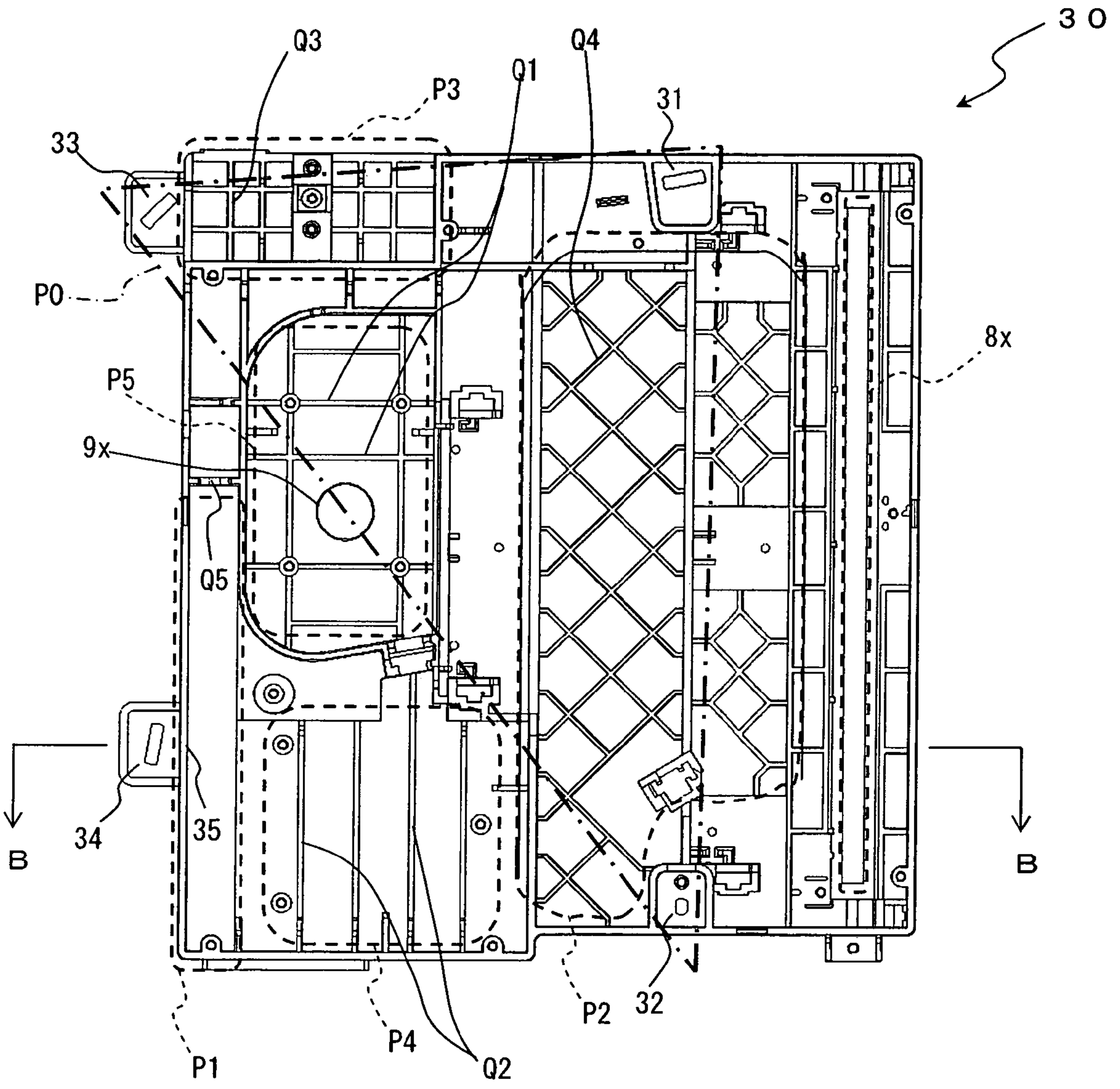
FIG. 3 is a plan view showing a unit chassis 30 constituting Optical unit X.
Figure 4:
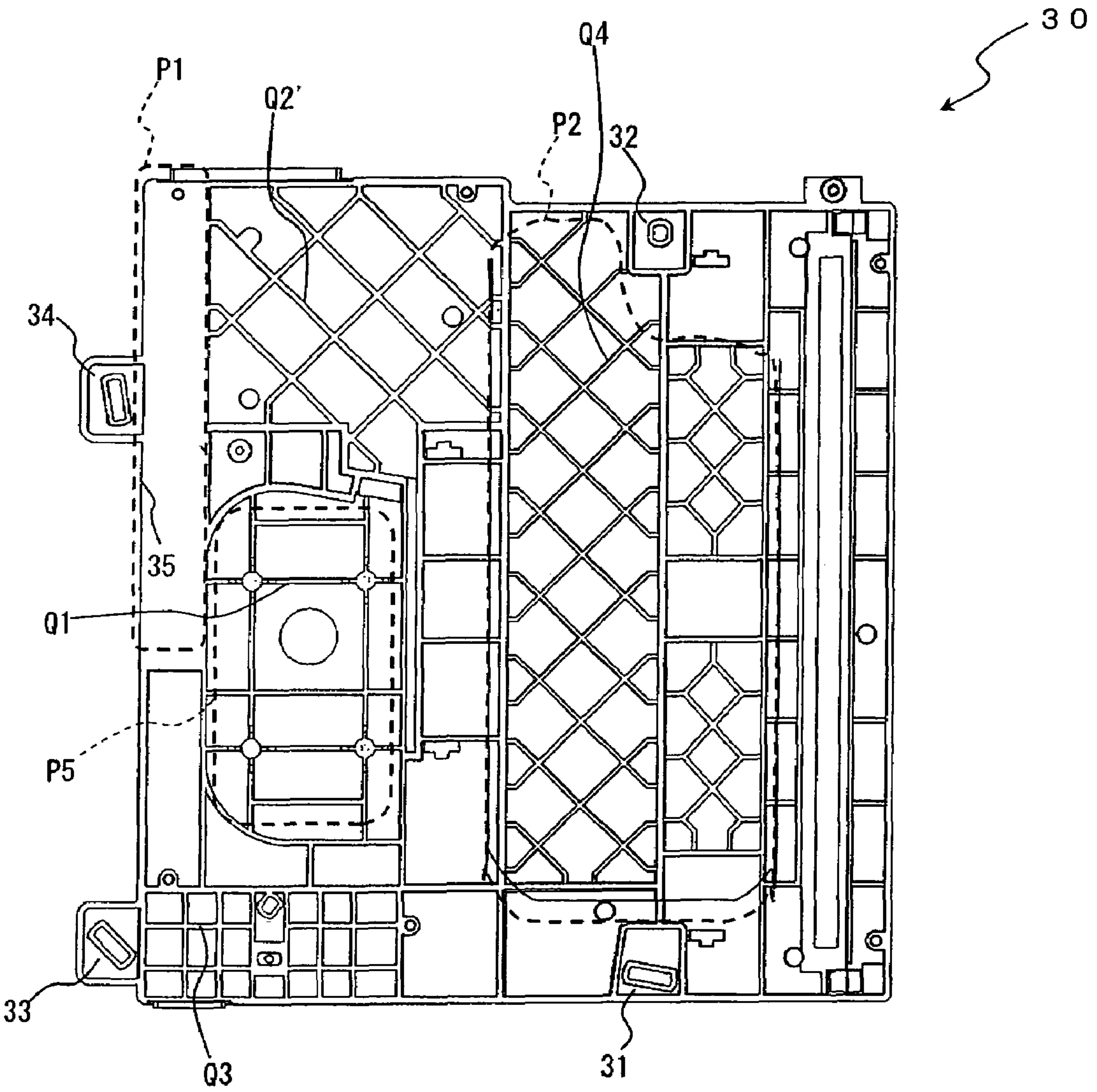
FIG. 4 is a bottom plan view showing Unit chassis 30 constituting Optical unit X.
Figure 5:
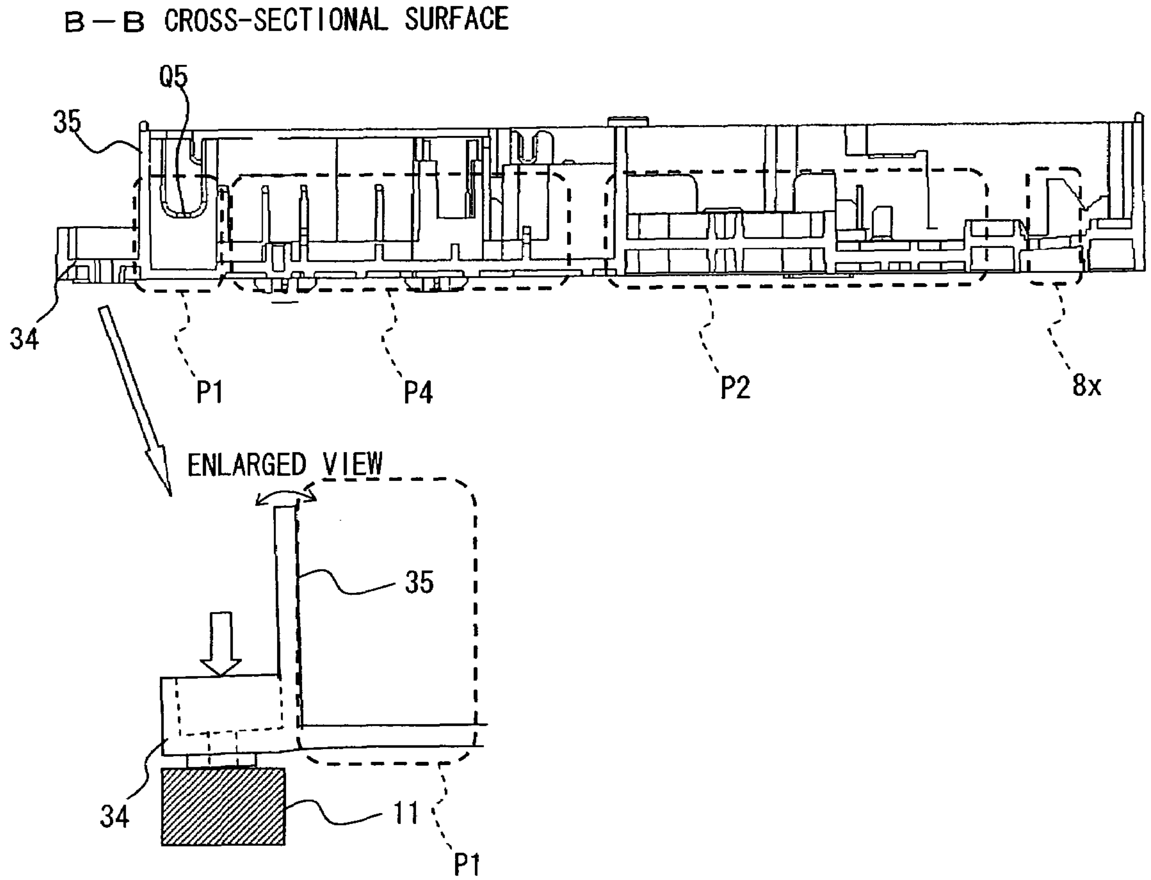
FIG. 5 is a cross-sectional view showing Unit chassis 30 constituting Optical unit X.

As shown in the plan view in FIG. 3 and the bottom plan view in FIG. 4, ribs Q1 to Q5 are formed in a reticular or parallel pattern across the almost entire areas including the areas indicated as P2 to P5 in the Figs., excepting a partial area P1, and with this rib structure (one example of reinforcing structures), Unit chassis 30 is reinforced. As a reinforcing structure, other than the rib structure, it is contemplated to make the reinforcing member thick-walled, however, the rib structure achieves more effective reinforcement for having lightweight.

In addition, three of Fixing members 31, 32 and 33 among four of Fixing members 31, 32, 33 and 34 are formed in the reinforcing areas (excepting P1 area) reinforced by the rib structure or in the contiguous areas thereof in Unit chassis 30. In the embodiment illustrated in FIG. 3, Fixing members 31 and 32 are formed in the reinforcing areas, and Fixing member 33 is formed in the contiguous area of the reinforcing area. Hereinafter, Fixing members 31, 32 and 33 in the positions reinforced by the reinforcing structure are referred to as “main fixing members”.

These main fixing members are fixedly supported by such as screw fastening to Supporting member 11 in the side of the main body.

On the other hand, Fixing member 34 in the remaining one place is formed in association with a wall 35 (one example of a flexible member, and hereinafter referred to as “flexible wall”) having flexibility and connected to the reinforcing areas in Unit chassis 30. Hereinafter, Fixing member 34 in association with the part having flexibility is referred to as “subsidiary fixing member”. As shown in FIGS. 3, 4 and 5, Flexible wall 35 constitutes a part of the outer edge of Unit chassis 30. Moreover, Flexible wall 35 is the wall connected to the reinforcing areas from a buffering area P1, in which ribs are not provided as the reinforcing structure, in the prescribed range adjacent to the reinforcing areas. Subsidiary fixing member 34 is also fixedly supported by such as screw fastening to Supporting member 11 in the side of the main body.

As mentioned above, Fixing members 31, 32, 33 and 34 in four places are formed in the edges or in the vicinity thereof of Unit chassis 30, so that such places forms a square.

Also, the optical instruments for image formation, such as Light source Z, Polygon mirror 9, and Deflecting mirror 8 are mounted in the reinforcing areas. In particular, in FIG. 3, they are respectively mounted as follows: Light source Z in the area indicated as P3, Polygon mirror 9 in the position indicated as 9*x*, and Deflecting mirror 8 in the position indicated as 8*x*.

Here, a circumstance is discussed when Subsidiary fixing member 34 formed outside of Flexible wall 35 is fixed to Supporting member 11 in the side of the main body under the condition where the reinforcing areas are positioned with Main fixing members 31, 32, and 33 fixed to Supporting members 11 in the side of the main body, and accordingly Subsidiary fixing member 34 is displaced. In this case, as shown in the enlarged view in FIG. 5, a part of Buffering area P1 and a portion of Flexible wall 35 deflect with relative ease since Flexible wall 35 is not reinforced by ribs, and the vibration in the part of Buffering area P1 and the portion of Flexible wall 35 is therefore not transmitted to the reinforcing areas.

In this point, the circumstance is different when Main fixing members 31, 32 and 33, that are formed so as to be contiguous to the areas reinforced by the ribs Q 4 and Q3, are displaced.

As a result, even when fixed by Fixing members 31, 32, 33 and 34 in four places, the optical instruments to be mounted in the reinforcing areas can be positioned with high accuracy, as in the case with fixings in three places. Furthermore, with Subsidiary fixing member 34 also fixed by Supporting member 11 in the side of the main body, the free part is nearly eliminated, and Unit chassis 30 can therefore be prevented from resonating with the vibration created from the rotation of Polygon mirror 9.

In addition, when Polygon mirror 9 (one example of light scanning means) for scanning beam light is provided as a structural element of the optical instruments as similar to the present embodiment, it becomes the vibration source. As shown in FIG. 3, the mounting position 9*x* of the instrument such as Polygon mirror 9 as the vibration source is preferred to be the position inside of the area (the area indicated as P0 in FIG. 3) of a triangle formed by three of Main fixing members 31, 32, and 33, or in the vicinity thereof in Unit chassis 30. The area inside of a triangle P0 formed by three of Main fixing members 31, 32, and 33, or in the vicinity thereof are the area hard to resonate compared with other areas, and therefore, by placing the vibration source in such areas, the entire Unit chassis 30 may hardly resonate.

Further, among the reinforcing areas, an area P4 close to the mounting position 9*x* of the vibration source (Polygon mirror 9) outside of Triangle P0 is preferred to form rib Q2 that extends along the emission direction from the vibration source (nearly downward direction in FIG. 3), in other words, the propagation direction of vibration or the close direction thereof (direction intersecting at a sharp angle). In the examples illustrated in FIGS. 3 and 4, Rib Q2 is formed in one side (top surface, see FIG. 3), and Rib Q2' in a reticular pattern extending in the direction intersecting at a sharp angle in the above-mentioned emission direction is formed in the other side (rear surface, see FIG. 4).

With these ribs note above, the vibration propagation from the vibration source (Polygon mirror 9) can be deadened more effectively than providing ribs extending in the nearly perpendicular direction to the vibration propagation direction.

Also, when such as Polygon mirror 9 as the light scanning means, as well as Deflecting mirror 8 (one example of reflecting mirrors) for reflecting the beam light scanned by Polygon mirror 9 across its scanning range are provided as a structural element of the optical instruments as similar to the present embodiment, Deflecting mirror is easily influenced from the vibration propagated from the vibration source especially such as Polygon mirror 9 among the optical instruments, since having long and thin figure.

Therefore, as shown in FIG. 3, it is preferred to have the structure in which Mounting position 9*x* of Polygon mirror 9 as the vibration source and Mounting position 8*x* of Deflecting mirror 8 are positioned respectively in each side of the reinforcing areas in Unit chassis 30 facing each other, and an area P2 (hereinafter referred to as "high-reinforcing area P2") reinforced more than any other areas by ribs Q4 in a reticular pattern formed in both of the top surface and the rear surface is formed in the area between Mounting position 9*x* of Polygon mirror 9 and Mounting position 8*x* of Deflecting mirror 8, and further, Main fixing members 31 and 32 among three of the main fixing members are formed having High-reinforcing area P2 between them.

With the above structure, High-reinforcing area P2 between Main fixing members 31 and 32 in two places becomes the area particularly hard to vibrate, and further, the vibration propagation from Polygon mirror 9 is intercepted by High-reinforcing area P2, therefore, the vibration propagation to Deflecting mirror 8 having long, thin and vibration sensitive figure can be prevented.

In the embodiments described above, Main fixing members 31, 32, and 33 in three places as well as Subsidiary fixing member 34 in one place are formed in Unit chassis 30, however, it is contemplated having two of Subsidiary fixing members 34 in two places.

FIGS. 6 (*a*) and (*b*) illustrate arrangement examples of Main fixing members 31, 32, and 33, as well as Subsidiary fixing member 34 connected to said main fixing members by Buffering area P1 in Unit chassis 30. Both are having Main fixing members 31, 32, and 33 in three places.

In FIG. 6(*a*), Subsidiary fixing members 34 are formed in two places, and these and Main fixing members 31, 32, and 33 are arranged so as to form a square, and in FIG. 6(*b*), Subsidiary fixing members 34 are also formed in two places, and these and Main fixing members 31, 32, and 33 are arranged so as to form a pentagon. These arrangements are one of the examples of the embodiment according to the present invention.

In addition, Image forming apparatus A illustrated in FIG. 1 is the image forming apparatus of black-and-white having one Photoreceptor drum 1, however, the image forming apparatus employing the present invention can be a color image forming apparatus.

For example, in regard to the image forming apparatus of the tandem system (that is to say, color image forming apparatus), which forms respective toner images of a plurality of colors (for example, the four colors including Black, Magenta, Yellow, and Cyan) onto a plurality of the photoreceptor drums independently then superimposes and transfers these images, when the accuracy of relative irradiation positions between each of beam lights corresponding to each color (especially, the accuracy of skew) is low, there might occur relative misalignment in transferring positions of toner images of each color in addition to the unevenness and warps of images, thereby distinctly deteriorating image quality. Consequently, when a color image forming apparatus comprises Optical unit X consisted of Unit chassis 30 in which the optical instruments, such as an instrument performing batch scanning of a plurality of beam lights or an instrument for leading such plurality of scanned beam lights onto each of the photoreceptor drums are mounted, the deterioration of the image quality can be effectively prevented, thereby achieving more preferable image formation.

What is claimed is:

1. An image forming apparatus, comprising:

a main body having supporting mounts; and a unit chassis including optical instruments for image formation being mounted thereon, and said unit chassis being fixedly supported on said supporting mounts;

said unit chassis having reinforcing areas reinforced by a reinforcing structure, said optical instruments being mounted in said reinforcing areas;

said unit chassis having three main fixing members formed connected to respective ones of said reinforcing areas so as to be reinforced by said reinforcing structure, said three main fixing members being formed one of within said respective reinforcing areas or contiguous to said reinforcing structure, said three main fixing members being respectively fixedly fastened to said supporting mounts;

said unit chassis having at least one subsidiary fixing member connected to said reinforcing areas by a buffer area and a flexible member having flexibility greater than connections of said three main fixing members to said reinforcing areas, and said subsidiary fixing member being fixedly supported by a respective one of said supporting mounts and said buffer area deflecting such that subsidiary fixing member is deflective from a position relative said three main fixing members prior to mounting of said unit chassis to said supporting mounts and such that said deflecting reduces vibration of said unit chassis, said reinforcing areas having sufficient rigidity such that said reinforcing areas remain substantially free of warping when said subsidiary fixing member is deflected relative thereto thereby maintaining positional accuracy of said optical instruments mounted in said reinforcing areas;

said three main fixing members and said subsidiary fixing member being respectively formed in a plurality of places that define a polygon having at least four angles in edges or in vicinity thereof of said unit chassis.

2. An image forming apparatus according to claim 1, wherein said flexible member is a wall forming a part of an outer edge of said unit chassis, and formed in a prescribed range from said reinforcing areas and is connected to said reinforcing areas by said buffering area, and said buffering area is formed without reinforcing structure so as to be provide flexibility.

3. An image forming apparatus according to claim 1, wherein said reinforcing structure is a rib structure formed in said unit chassis.

4. An image forming apparatus according to claim 2, wherein said reinforcing structure is a rib structure formed in said unit chassis.

5. An image forming apparatus according to claim 1, wherein:

said optical instruments include a light scanning means for scanning a beam light;

said three main fixing member define a triangle;

said light scanning means is mounted inside of said triangle defined by said three of main fixing members or in the vicinity thereof.

6. An image forming apparatus according to claim 2, wherein:

said optical instruments include a light scanning means for scanning a beam light;

said three main fixing member define a triangle;

said light scanning means is mounted inside of said triangle defined by said three of main fixing members or in the vicinity thereof.

7. An image forming apparatus according to claim 3, wherein:

said optical instruments include a light scanning means for scanning a beam light;

said three main fixing member define a triangle;

said light scanning means is mounted inside of said triangle defined by said three of main fixing members or in the vicinity thereof.

8. An image forming apparatus according to claim 4, wherein:

said optical instruments include a light scanning means for scanning a beam light;

said three main fixing member define a triangle;

said light scanning means is mounted inside of said triangle defined by said three of main fixing members or in the vicinity thereof.

9. An image forming apparatus according to claim 5, wherein:

said light scanning means is mounted in one of said reinforcing areas and ribs are disposed in said one of said reinforcing areas as said reinforcing structure; and said ribs extend along a direction of an emitting direction from said light scanning means or a direction substantially extending in said emitting direction and said ribs extend outside of said triangle defined by said three of main fixing members.

10. An image forming apparatus according to claim 6, wherein:

said light scanning means is mounted in one of said reinforcing areas and ribs are disposed in said one of said reinforcing areas as said reinforcing structure; and said ribs extend along a direction of an emitting direction from said light scanning means or a direction substantially extending in said emitting direction and said ribs extend outside of said triangle defined by said three of main fixing members.

11. An image forming apparatus according to claim 7, wherein:

said light scanning means is mounted in one of said reinforcing areas and ribs are disposed in said one of said reinforcing areas as said reinforcing structure; and said ribs extend along a direction of an emitting direction from said light scanning means or a direction substantially extending in said emitting direction and said ribs extend outside of said triangle defined by said three of main fixing members.

12. An image forming apparatus according to claim 8, wherein:

said light scanning means is mounted in one of said reinforcing areas and ribs are disposed in said one of said reinforcing areas as said reinforcing structure; and said ribs extend along a direction of an emitting direction from said light scanning means or a direction substantially extending in said emitting direction and said ribs extend outside of said triangle defined by said three of main fixing members.

13. An image forming apparatus according to claim 5, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

14. An image forming apparatus according to claim 6, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

15. An image forming apparatus according to claim 7, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

16. An image forming apparatus according to claim 8, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

17. An image forming apparatus according to claim 9, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

18. An image forming apparatus according to claim 10, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

19. An image forming apparatus according to claim 11, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

20. An image forming apparatus according to claim 12, wherein:

said optical instruments further include a reflecting mirror for reflecting a beam light scanned by said light scanning means across a scanning range;

said light scanning means and said reflecting mirror are mounted in respective positions facing each other in said reinforcing areas in said unit chassis;

said reinforcing areas include a high-reinforcing area reinforced more than other areas of said reinforcing areas, said high-reinforcing area is formed between said light scanning means and said reflecting mirror; and said three main fixing members include two fixing members of said three main fixing members being formed in at two places having said high-reinforcing area between said two places.

21. An image forming apparatus according to claim 1, wherein said unit chassis is a solidly shaped plastic molded member.

22. An image forming apparatus, comprising:

a main body having supporting mounts;

a unit chassis including optical instruments for image formation being mounted thereon, said unit chassis being fixedly supported at on said supporting mounts;

said unit chassis having reinforcing areas reinforced by a reinforcing structure in said unit chassis, said optical instruments being mounted in said reinforcing areas;

said unit chassis having three main fixing members formed connected to respective ones of said reinforcing areas so as to be reinforced by said reinforcing structure, said three main fixing members being formed one of within said respective reinforcing areas or contiguous to said reinforcing structure, said three main fixing members being respectively fixedly fastened to said supporting mounts;

said unit chassis having at least one subsidiary fixing member connected to said reinforcing areas in said unit chassis by a buffer area and a flexible member having flexibility greater than connections of said three main fixing members to said reinforcing areas, and said subsidiary fixing member being fixedly supported by a respective one of said supporting mounts and said buffer area deflecting such that subsidiary fixing member is deflective from a position relative said three main fixing members prior to mounting of said unit chassis to said supporting mounts and such that said deflecting reduces vibration of said unit chassis; and said main fixing members and said subsidiary fixing member being respectively formed in a plurality of places that define a polygon having at least four angles in edges or in vicinity thereof of said unit chassis, wherein, in the image forming apparatus comprising said optical instruments mounted in said reinforcing areas, first and second main fixing members of said main fixing members are provided in two respective places placing a high-reinforcing area having a horizontally elongated rectangular shape therebetween, said high-reinforcing area being a one of said reinforcing areas providing a greatest degree of reinforcing within said unit chassis;

a vibration source including a polygon mirror that forms a part of said optical instruments is provided on a line connecting said first main fixing member with a third main fixing member of said main fixing members; and said subsidiary fixing member, said polygon mirror, said high-reinforcing area, and a polarizing mirror forming a part of said optical instruments are arranged in sequential order when said unit chassis is viewed in plan.

23. An image forming apparatus, comprising:

a main body having supporting mounts; and a unit chassis including optical instruments for image formation being mounted thereon, said unit chassis being fixedly supported on said supporting mounts, said unit chassis including a reinforced region defined by reinforcing areas which are reinforced by reinforcing structure, said optical instruments being mounted in said reinforced region;

said unit chassis including three main fixing members formed in said reinforced region, said three main fixing members being fixedly fastened to respective ones of said supporting mounts;

said unit chassis further including at least one subsidiary fixing member connected to said reinforced region by a flexible member having flexibility greater than said reinforced region, said at least one subsidiary fixing member being fixedly fastened to a respective at least one of said supporting mounts, and said flexible member allowing deflection of said subsidiary fixing member from a position relative to said three main fixing members prior to mounting of said unit chassis to said supporting mounts, said deflection being effective for reducing vibration of said unit chassis, said reinforced region having sufficient rigidity such that said reinforcing areas remain substantially free of warping when said subsidiary fixing member is deflected relative thereto thereby maintaining positional accuracy of said optical instruments mounted in said reinforcing areas;

said three main fixing members and said subsidiary fixing member being respectively formed in a plurality of places that define a polygon having at least four angles in edges or in vicinity thereof of said unit chassis.

* * * * *